United States Patent [19]

Peters

[11] Patent Number: 4,508,855

[45] Date of Patent: Apr. 2, 1985

[54] DRY MIX FRICTION BEARING MATERIAL

[75] Inventor: Walter B. Peters, Englewood, Colo.

[73] Assignee: Manville Service Corporation, Denver, Colo.

[21] Appl. No.: 628,172

[22] Filed: Jul. 6, 1984

[51] Int. Cl.³ .......................... C08L 61/10; C08K 3/22
[52] U.S. Cl. ..................................... 523/153; 523/155; 523/156; 523/158; 524/433; 524/509; 525/142; 260/998.13
[58] Field of Search ............... 523/153, 155, 156, 158; 260/998.13; 524/433, 509; 525/142; 106/36

[56] References Cited

U.S. PATENT DOCUMENTS

| | | | |
|---|---|---|---|
| 3,297,599 | 1/1967 | Eschen | 260/3 |
| 3,344,094 | 9/1967 | de Gaugue | 260/5 |
| 3,346,490 | 10/1967 | Eschen | 252/12.4 |
| 3,832,325 | 8/1974 | Eschen | 260/38 |
| 4,111,891 | 9/1978 | Reynolds, Jr. | 260/38 |
| 4,178,278 | 12/1979 | Reynolds, Jr. | 260/42.22 |
| 4,352,750 | 10/1982 | Eschen | 523/156 |
| 4,371,631 | 2/1983 | Peters | 523/153 |

*Primary Examiner*—Theodore E. Pertilla
*Attorney, Agent, or Firm*—Ronald M. Halvorsen; Cornelius P. Quinn; Gregory A. Evearitt

[57] ABSTRACT

A friction material suitable for use as a bearing, comprising:
- (a) 20–40 weight percent phenolic resin;
- (b) 5–15 weight percent graphite;
- (c) 0.5–3.5 weight percent carbon black;
- (d) 40–60 weight percent of a non-asbestos containing refractory fiber comprising at least 25 wt. % CaO and 35 wt. % $SiO_2$; and
- (e) 4–10 weight percent acrylic fiber.

6 Claims, No Drawings

DRY MIX FRICTION BEARING MATERIAL

This invention relates to a novel friction product suitable for use as a bearing material.

There exists a continued need in industry for friction products which can be used as bearing materials, especially in the transportation industry. Bearing materials, of course, play an important role in that they help to reduce vibrational movements. This is quite important in the railroad and automotive industries.

Over the years asbestos has been used as a reinforcing ingredient in friction bearing materials. However, recently asbestos has not been in high demand for use in the industry. Therefore, alternatives for an asbestos containing friction bearing material have been sought which still provide comparable physical properties such as strength, wear rates, good frictional coefficients, etc. as exhibited by the asbestos containing products.

Therefore, it is an object of this invention to provide a non-asbestos containing novel friction product which would make an effective bearing material.

Other aspects, objects, and the several advantages of the present invention will become apparent from this specification and the appended claims.

In accordance with the present invention, I have discovered a novel asbestos free friction material which is useful for bearing applications. This novel material comprises the following ingredients: (a) phenolic resin; (b) graphite; (c) carbon black; (d) a non-asbestos containing refractory fiber; and (e) acrylic fiber. This asbestos-free friction material has physical properties which are comparable to those of asbestos containing friction materials used as bearings.

The following table indicates the general, preferred, and most preferred weight percentage levels for the above ingredients in the novel friction material of the present invention.

TABLE A

| Ingredient | Weight Percent | | |
|---|---|---|---|
| | General | Preferred | Most Preferred |
| Phenolic Resin | 20–40 | 25–35 | 30 |
| Graphite | 5–15 | 8–12 | 10 |
| Carbon Black | .5–3.5 | 1–3 | 2 |
| Non-Asbestos Refractory Fiber | 40–60 | 45–55 | 51 |
| Acrylic Fiber | 4–10 | 6–8 | 7 |

The phenolic resin used in the present invention should be one suitable for use as a binder. Such resins are typically the reaction product of a phenol and an aldehyde of which formaldehyde is exemplary. Such materials are quite well known and are widely described in the literature. A typical description will be found in Modern Plastics Encyclopedia, Vol. 4, No. 10 (1970–1971).

Any commercially available grade of graphite and carbon black can be used in the present invention. Whatever commercially available materials are used, the materials will be essentially pure carbon with particle sizes substantially (i.e. at least about 95%) less than about 74 millimicrons. These materials are incorporated into the friction material for several reasons including to impart color, to provide strength, and to help impart low friction.

The asbestos-free refractory fibers used in this invention will generally comprise at least 25 wt.% CaO and 35 wt.% $SiO_2$, preferably at least 30 wt.% CaO and 40 wt.% $SiO_2$. Typically the refractory fibers are single-stranded. An exemplary asbestos-free refractory fiber is the PMF TM Fiber produced by Jim Walter Resources, Inc. of Birmingham, Ala. Whatever refractory fiber is employed should generally have an average diameter of 2–10 microns, preferably 4–6 microns, and an average aspect ratio (length/diameter) of 30–70, preferably 40–60.

For the purposes of this invention, an acrylic fiber is defined as being any fibrous substance containing at least 85 weight percent of acrylonitrile ($—CH_2CH(CN)—$) units. Preferably, the acrylic fiber will be a 100% polyacrylonitrile homopolymer such as Dolanit 10 TM marketed by Hoechst Fiber Industries of Spartanburg, S.C.

The materials of this invention may be molded into friction materials in any conventional manner. This normally constitutes pre-mixing of the dry ingredients, insertion of the mixture into a mold and then molding at an elevated temperature and pressure to cause the phenolic resin binder to form a solid matrix incorporating the other components.

Generally, the temperature for molding the mixture is from about 275° F. to about 325°, with about 300° F. preferred. Typical molding pressures are from about 1000 to about 2000 p.s.i. preferably about 1300–1500 p.s.i. The typical molding time is from about 10 minutes to 50 minutes.

In Table I below, a typical composition of this invention is illustrated. Also illustrated is a typical composition for an asbestos containing friction material. Both compositions were made by the basic mixing and molding procedures described herein above.

In Table I, all components are given in percentage by weight (rounded off to the nearest whole percentage).

TABLE I

| Ingredient | Asbestos-Containing Composition | Inventive Composition |
|---|---|---|
| Phenolic Resin (a) | 30% | 30% |
| Amorphous Graphite | 10% | 10% |
| Carbon Black | 2% | 2% |
| Asbestos Fiber (b) | 58% | — |
| Refractory Fiber (c) | — | 51% |
| Acrylic Fiber (d) | — | 7% |
| | 100% | 100% |

NOTES
(a) Johns-Manville No. 421 Powdered Phenol-Formaldehyde Resin
(b) 7D02 Asbestos Fiber
(c) Processed Mineral Fiber No. 204 from Jim Walters Resources, Inc., Birmingham, Alabama
(d) Dolanit 10 from Hoechst, Spartanburg, N.C.

Table II below gives comparative values for both the asbestos containing and asbestos free compositions of Table I relating to both shear strength and compressive strength.

TABLE II

| Property | Test Method | Asbestos-Containing Composition | Inventive Composition |
|---|---|---|---|
| Shear Strength psi | ASTM-D-732* | 7,050 | 7,240 |
| Compressive Strength psi | ASTM-D-695* | | |
| Ultimate | | ≧30,000 | ≧30,000 |
| Yield | | 18,000 | 16,650 |
| Modulus of Elasticity | | 121,000 | 107,100 |

*0.05 in/min. travel and sample thickness of ¼" nominal.

The above data in Table II indicate that the inventive asbestos-free composition has both shear and compressive strength properties statistically similar to those of the asbestos-containing composition.

Table III below illustrates comparative wear test data for the two compositions of Table I. In such tests, a driven head containing a friction material sample (either asbestos-containing or asbestos-free) of 1⅜" diameter by ¼" thickness is forced against a stationary steel plate under a load of 100 psi. The driven head is rotated at predetermined velocities of from 17 to 68 mph. After an initial run-in period, the actual test is conducted in the following manner: The friction material sample is precisely weighed and measured. It is then put through four "phases" of engagement with the steel plate. In each phase the sample makes a series of engagements with the steel plate, each engagement lasting for a certain interval and is followed by a second cooling and disengagement interval. At the end of each phase the sample is precisely weighed and measured. Following the four phases, a final "drag" is conducted. In this phase, the sample and steel plate are held in continuous engagement for 30 minutes while the driven head is run at 20 mph.

Results of these tests are shown below:

TABLE III

| Rotor Speed (mph) | Cycle Time (sec.) on/off | No. of Cycles | Av. Coeff. Friction Asb. Comp. | Av. Coeff. Friction Inv. Comp. | Av. Rate of Wear* Asb. Comp. | Av. Rate of Wear* Inv. Comp. |
|---|---|---|---|---|---|---|
| 68 | 25/75 | 18 | 0.13 | 0.10 | 0.015 | .015 |
| 51 | 15/45 | 30 | 0.09 | 0.08 | 0.020 | .005 |
| 34 | 10/30 | 45 | 0.10 | 0.11 | 0.005 | .003 |
| 17 | 10/30 | 45 | 0.14 | 0.20 | 0.003 | .001 |
|  |  |  | (1) | (2) | (3) | (4) |

*in³hr. hr.
(1) 0.115 - Average value
(2) 0.122 - Average value
(3) 0.011 - Average value
(4) 0.006 - Average value The above data in Table III indicates comparable average values (0.115 vs. 0.122) between the asbestos-containing friction composition and the inventive asbestos-free friction composition relating to the average coefficient of friction. However, the test data show a better overall average rate of wear for the inventive composition (0.006 in³/hp. hr.) compared to the asbestos-containing composition (0.011 in³/hp. hr.).

Reasonable variations and modifications are possible from the foregoing without departing from either the scope or spirit of the present invention.

I claim:

1. A friction material suitable for use as a bearing, comprising:
   (a) 20–40 weight percent phenolic resin;
   (b) 5–15 weight percent graphite;
   (c) 0.5–3.5 weight percent carbon black;
   (d) 40–60 weight percent of a non-asbestos refractory fiber comprising at least 25 wt.% CaO and 35 wt.% SiO$_2$; and
   (e) 4–10 weight percent acrylic fiber.

2. A friction material, according to claim 1 suitable for use as a bearing, comprising:
   (a) 25–35 weight percent phenolic resin;
   (b) 8–12 weight percent graphite;
   (c) 1–3 weight percent carbon black;
   (d) 45–55 weight percent of a non-asbestos refractory fiber comprising at least 25 wt.% CaO and 35 wt.% SiO$_2$; and
   (e) 6–8 weight percent acrylic fiber.

3. A friction material, according to claim 2, comprising:
   (a) 30 weight percent phenolic resin;
   (b) 10 weight percent graphite;
   (c) 2 weight percent carbon black;
   (d) 51 weight percent of a non-asbestos refractory fiber comprising at least 25 wt.% CaO and 35 wt.% SiO$_2$; and
   (e) 7 weight percent acrylic fiber.

4. A friction material according to claim 1 wherein said phenolic resin in 1(a) is a phenol-formaldehyde resin.

5. A friction material according to claim 1 wherein said non-asbestos refractory fiber in 1(d) comprises at least 30 wt.% CaO and 40 wt.% SiO$_2$.

6. A friction material according to claim 1 wherein said acrylic resin is a 100% acrylonitrile homopolymer.

* * * * *